US005182157A

United States Patent [19]

Fitch

[11] Patent Number: 5,182,157

[45] Date of Patent: Jan. 26, 1993

[54] METHOD OF FORMING A COATED SHEET WHICH WICKS AWAY OIL AND PRODUCT THEREOF

[75] Inventor: John J. Fitch, Natick, Mass.

[73] Assignee: Van Leer Metallized Products (U.S.A.) Limited, Mid-Glamorgan, Wales

[21] Appl. No.: 376,148

[22] Filed: Oct. 15, 1991

Related U.S. Application Data

[63] Continuation-in-part of Ser. No. 608,049, Nov. 1, 1990.

[51] Int. Cl.[5] .......... B32B 3/10; B32B 3/26

[52] U.S. Cl. .......... 428/137; 428/159; 428/304.4; 428/314.2

[58] Field of Search .......... 428/68, 74, 137, 159, 428/304.4, 314.2

[56] References Cited

U.S. PATENT DOCUMENTS 4,379,804 4/1983 Eisele et al. .......... 428/332
4,440,827 4/1984 Miyamoto et al. .......... 428/327
4,481,244 11/1984 Haruta et al. .......... 428/155
4,542,059 9/1985 Toganoh et al. .......... 428/141
4,544,580 10/1985 Haruta et al. .......... 427/261
4,547,405 10/1985 Bedell et al. .......... 427/256
4,642,247 2/1987 Mouri et al. .......... 428/195
4,877,688 10/1989 Senoo et al. .......... 428/522
5,024,875 6/1991 Hill et al. .......... 428/315.5
5,027,131 6/1991 Hasegawa et al. .......... 428/327

FOREIGN PATENT DOCUMENTS 0399785 11/1990 European Pat. Off. .
WO89/03760 5/1989 PCT Int'l Appl. .......... 428/172

*Primary Examiner*—William J. Van Balen
*Attorney, Agent, or Firm*—Young & Thompson

[57] ABSTRACT

A coated sheet for decorative or informational applications is formed of an oil absorbing substrate and an oil permeable decorative layer. The decorative layer is a porous oleophilic membrane formed from fused polymer particles. Skin oil and certain other liquids placed on the exposed surface of the decorative layer are absorbed into the sheet so that they do not appear on that surface and do not interfere with the optical effect of diffraction gratings or holograms thereon.

6 Claims, 4 Drawing Sheets

METHOD OF FORMING A COATED SHEET WHICH WICKS AWAY OIL AND PRODUCT THEREOF

This is a continuation-in-part of copending application Ser. No. 07/608/049 filed on Nov. 1, 1990.

FIELD OF INVENTION

This invention relates to the decoration of sheeting, and more particularly to the decoration of materials such as standard, light weight, cellulosic sheets (paper). This invention also relates to the embossment of sheets or films, and more particularly to the wicking away of oil from the decorative surface of sheets or films.

DESCRIPTION OF THE PRIOR ART

Cellulosic sheets are normally decorated by imprinting. To achieve certain special effects, the imprinting requires special inks and relatively complex printing procedures. In addition, some decorative effects can not be realized by imprinting. One very desirable decorative effect is the iridescent visual effect created by a diffraction grating. This striking visual effect, attributed to Sir John Barton, Director of the British Royal Mint (circa 1770), occurs when ambient light is diffracted into its color components by reflection from a diffraction grating. A diffraction grating is formed when closely and regularly spaced grooves (5,000 to 11,000 grooves per cm.) are embossed on a reflective surface.

In recent times, this diffraction grating technology has been employed in the formation of two-dimensional holographic images which create the illusion of a three-dimensional image to an observer. This holographic image technology can form very attractive displays. Furthermore, because the economics of forming holographic images is significantly dependent upon economies of scale, the concept of using holographic images to discourage counterfeiting has found wide application.

The original diffraction gratings were formed by scribing closely and uniformly spaced lines on polished metal surfaces using special "ruling engines". Subsequently, techniques were developed to reproduce a master diffraction grating by shaping a moldable material against the master diffraction grating surface. More recently, thermoplastic films have been embossed by heat softening the surface of the film and then passing them through embossing rollers which impart the diffraction grating or holographic image onto the softened surface. In this way, sheets of effectively unlimited length can be decorated with the diffraction grating or holographic image on a surface. The decorated surface of polymers is normally sufficiently reflective that the optical effect of the diffraction grating occurs without further processing, because the incident light is reflected by the facets of the decorated surface. For the purposes of this application, the term diffraction grating includes holographic images that are based on diffraction grating technology.

Unfortunately, such an unprotected diffraction grating will lose its iridescent optical effect if the grooves of the surface become filled with almost any substance and, in particular, an oily substance. More specifically, on decorated surfaces which will be handled by human beings, the skin oil which is normally present on the fingers of human beings will fill the grooves in the decorated but unprotected surface and eliminate the iridescent effect from those portions of the surface covered by the oil.

If the decorated surface is coated with a protected transparent polymeric layer to keep the skin oil out of the grooves in the decorated surface, it has been found that the presence of the decorated layer itself will destroy the iridescent optical effect.

This problem can be resolved by metalizing the unprotected grooved surface to form reflective facets and then by coating the metalized surface with the protective layer. While the resulting product retains the iridescent effects, the metalizing process is very expensive and introduces a number of practical problems into the manufacture of embossed sheets.

These and other difficulties experienced with the prior art chemical processes have been obviated in a novel manner by the present invention.

It is accordingly an object of the present invention to provide a decorative surface system in which oil, which is deposited on the surface, is wicked away from the surface.

It is a further object of the present invention to provide a decorative surface system in which oil, which is deposited on the surface, does not interfere with the optical effect created by embossed diffraction patterns or holographic images which are present on the surface.

With the foregoing and other objects in view, which will appear as the description proceeds, the invention resides in the combination and arrangement of steps and the details of the composition hereinafter described and claimed, it being understood that changes in the precise embodiment of the invention herein disclosed may be made within the scope of what is claimed without departing from the spirit of the invention.

SUMMARY OF THE INVENTION

In accomplishing the foregoing and related objects, the present invention provides for embossing the coating of a substrate, such as paper sheeting. The coating is a thermosensitive material which has discernable thermoplastic properties. The term "thermoplastic", as used hereinafter, shall be construed to include such materials.

The paper advantageously is supplied with the coating of thermoplastic material. The thermoplastic coating is typically applied in a water base or other suitable liquid by gravure, or reverse roll methods.

The actual formation of the coating would begin by spreading a pre-membrane composition, formed of a dispersion of polymer spheres in evaporable liquid, onto the oil-absorbing paper substrate. Subsequently, the pre-membrane-covered substrate would be heated to evaporate the liquid and cause the polymer particles to fuse together. The resulting coating is a porous membrane capable of absorbing oil which is deposited on the coating surface and wicking the oil to the oil-absorbing paper substrate. Because the membrane is thermoplastic, it can be embossed to form a diffraction grating or holographic image. This must be done without destroying the porosity of the membrane; best oil wicking characteristics have been observed when the membrane has a cracked or crazed surface after embossing. The resulting optical effect or image will not be destroyed by oil which is deposited on the surface of the coating, because that oil will be wicked away from the surface and deposited in the underlying oil-absorbing paper substrate. Furthermore, ink adheres well to the decorative surface and, when lightly applied, does not interfere with the decorative effect produced by the embossment.

The preferred pre-membrane coating composition is an aqueous dispersion of spheres of an oleophilic polymer such as a styrene polymer. Applicant has observed that dispersions of substantially uniform particle size are preferred, and that generally larger particle sizes yield improved oil wicking characteristics. The most preferred dispersion comprises 0.5 micron diameter spheres of styrene/acrylic copolymer. The coating composition would also typically include a primer, a plasticizer, an emulsifier, a dispersant, pigment, and a defoamer. The plasticizer would be present in a minimum quantity, sufficient to provide adhesion of the membrane to the substrate, but insufficient to cause the membrane to have blocking qualities.

DESCRIPTION OF THE PREFERRED EMBODIMENT

Figure 1:
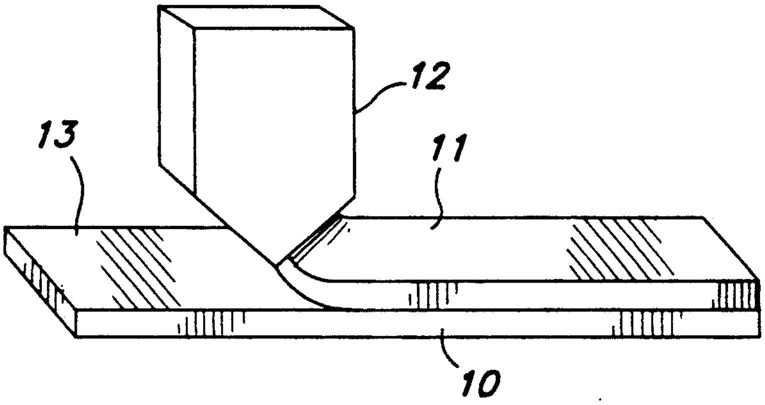
FIG. 1 is a schematic drawing which shows a coating operation.

The preferred embodiment of the present invention begins with the coating process set out in FIG. 1. Standard paper sheeting 10 is provided with a thermoplastic pre-membrane coating 11, for example, by pouring the liquid pre-membrane mixture from a feed box 12 onto the upper surface 13 of the paper sheeting 10. The thermoplastic coating 11 may also be applied in a solvent or water-base using gravure, or reverse roll methods, represented schematically by the feed box 12.

Paper sheeting 10 thickness usually varies from about 40 microns to about 100 microns. The paper sheeting 10 can also be cardboard stock having a thickness up to about 750 microns (note: 25.4 microns=0.001 inch). The coating weight of thermoplastic coating 11 should be sufficient to accept and retain the microembossed image; rougher papers require thicker thermoplastic coatings. On the other hand, higher coating weights tend to increase curl of the paper sheeting. The preferred range for the coating weight of thermoplastic coating 11 has been determined to be about 3–20 grams per square meter. In the preferred embodiment of this invention, the paper sheeting would provide both the strength for the final product and the oil absorbing property, which, as will be seen, draws oil through the coating. It would be possible to form the substrate from a first, very strong layer (e.g., polymeric film) and a second oil-absorbing paper layer between the first layer and the coating.

Other oil absorbing substrates may be employed in the invention in lieu of paper, such as, for example, nonwoven fabrics.

Figure 2:
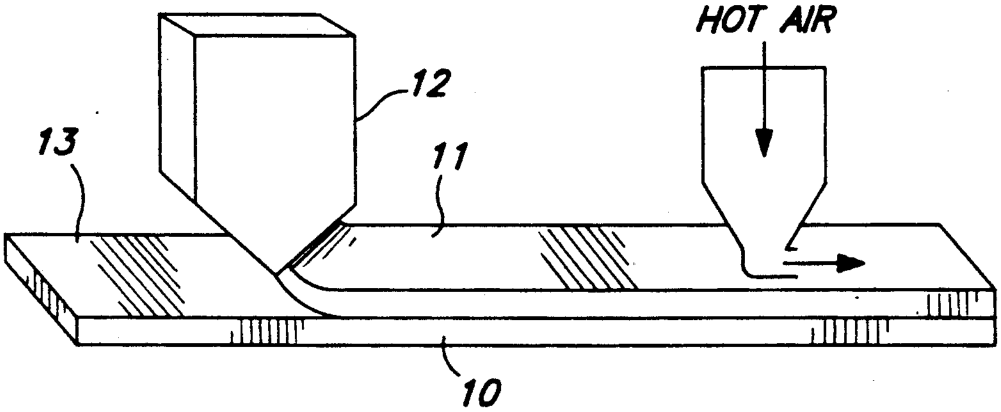
FIG. 2 is a schematic which shows heating of the coated substrate of FIG. 1.

Referring now to FIG. 2, once the coating 11 is applied to the upper surface 13 of the paper substrate 10, the coated substrate is outer layer of the coating 11 to evaporate the liquid carrier and to fuse or sinter the coating into a porous membrane.

To assure proper heating, softening, and fusing or sintering, additional heating can be employed. Particularly suitable is an infrared heater which can be disposed away from the surface that is being softened. Such a heater is operated at heater surface temperatures of about 1,000° F.

The thermoplastic (thermally deformable) coating 11 should be heated to well above its softening temperature. When employing a coated paper, a practical limit to the heating of coating 11 is about 230° C. (450° F.). Above that temperature, the paper substrate begins to degrade. In operation, it has been determined that coating 11 should be heated to a temperature typically between about 120° C. to 177° C. (250° F. to 350° F.), which range represents a preferred range for most thermoplastic coatings to be coalesced and embossed in the process of the present invention.

During the course of this heating operation, the pre-membrane mixture is coalesced. The coalescing process involves the evaporation of any water (or other liquid carrier) still present in the mixture after the coating operation and the fusing of the thermoplastic particles which are a primary component of the pre-membrane mixture. The resulting coating is a porous membrane firmly attached to the substrate.

After the softened thermoplastic layer has been coalesced to a porous membrane, the resulting laminate would normally be fed directly to the embossing step. However, it would be possible to allow the resulting laminate to be cooled down and stored so that the embossing step might take place at some later time.

It is more energy efficient, and therefore preferred, to feed the softened and fused laminate directly to the embossing step.

Figure 3:
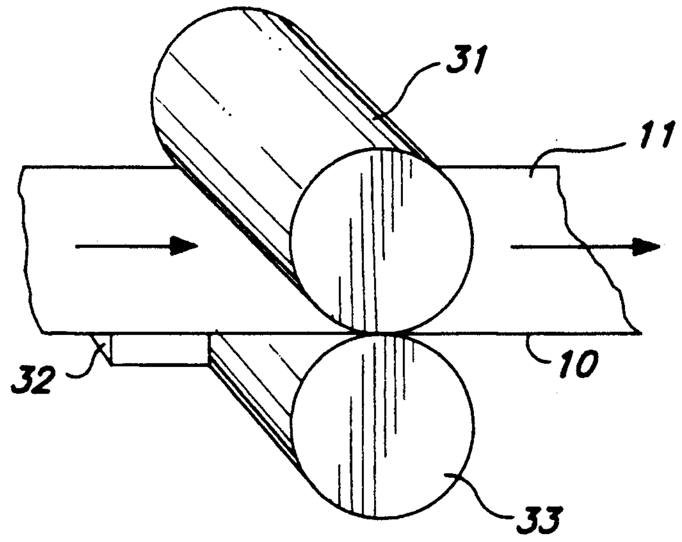
FIG. 3 is a perspective illustration of one form of embossment.

Referring now to FIG. 3, once the outer layer 11 of thermoplastic has been softened and fused to a porous membrane, an embossing arrangement is employed for decoration. The arrangement uses a heated platen 32, an embossing roll 31, and pressure nip roll 33. The embossing roller 31 is a conventional embossing master which has the desired embossing pattern on its surface. This pattern is produced on the roller or rollers by engraving, embossing with a hard material, or mounting patterned plastic films or metal foils on to the surface of the roller 31. When the embossing roller 31 contacts the softened plastic surface 11, the embossing pattern is transferred to the coating 11 on the paper. Simultaneously, the contact with the relatively cooler roller cools the coating. This cooling action prevents flow of the coating after it is removed from the embossing roller. The result is a decorated, polymer coated paper.

The temperature of the embossing master (embossing roller 31) must be below the softening temperature of the thermoplastic coating 11. The temperature of the embossing roller 31, however, should not be so low as to harden the coating 11 before the embossing is completed. It has been found that the preferred temperature for embossing roller 31 (embossing master) can vary depending on its thermoconductivity and specific heat, the embossing nip pressure, viscoelastic properties, operating speed, and the temperature to which coating is heated immediately prior to contact with the embossing roller 31. Despite the large number of variables, applicant has determined that the embossing master's (roller 31) preferred temperature in the process of the present invention is between about 66° C. (150° F.) to about 93° C. (208° F.) which is below the temperature of the thermoplastic coating 11. It has been determined that, in the context of the present process, this generally places the preferred web temperature between about 100° C. (212° F.) and 200° C. (392° F.).

Figure 4:
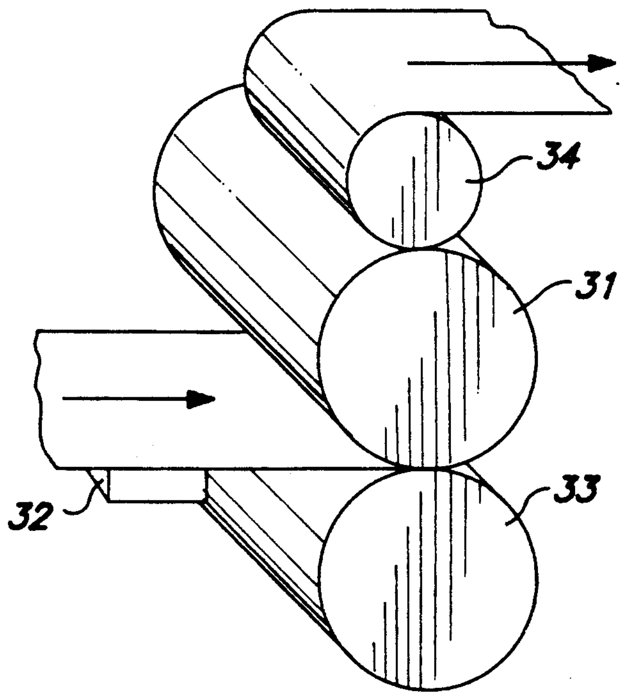
FIG. 4 is a perspective illustration of an alternative form of embossment.

In FIG. 4, an alternative arrangement, a take-off roller 34 has been added to allow longer contact between the thermoplastic coating 11 and the embossing roll 31. The longer contact time allows better cooling of the embossed surface to facilitate easy parting of the web from the embossing roll and to prevent possible re-flow of the coating and loss of the embossed pattern. The pressure nip roller 33 may be metal or may be surfaced with a resilient material such as rubber. The force applied between the pressure nip roller 33 and the embossing roller 31 should range from about 50 lbs. per lineal inch (PLI) to about 1,000 PLI along the length of the contact between the two rollers. The force applied between the pressure nip roller 33 and the embossing roller 31 may advantageously be 50–300 PLI, but is more preferably between about 100–200 PLI.

This latter range corresponds approximately to between about 40–90 lbs. per square inch. Contact pressure between two cylinders, or rollers, is often reported in pounds per lineal inch (PLI) rather than pounds per square inch. This is because the exact width (i.e., area) of contact between two rollers is not usually known, but the force applied in contact length are generally known.

The surface of the embossing roller (roller 31) should be hard and distortion resistant so that the embossing pattern is preserved during the embossing step. The opposing roller, i.e., nip roller 33, should be firm, but also somewhat resilient. This allows nip roller 33 to apply a nearly uniform distributed pressure to the back of the sheeting being embossed. It has been determined that nip roller 33 can be quite firm, typically with a Shore A durometer hardness (ASTM D-412) reading of about 70–80, or even somewhat higher, and yet not so hard as to interfere with attainment of a uniformly distributed pressure on the back of the sheeting being embossed. The contact (dwell) time wherein the embossing roller 31 and nip roller 33 contact the sheeting to achieve embossing, is generally in the range of about 8 milliseconds (E.G., 300 ft./min. for a ½ inch wide contact area) to about 0.2 millisecond (e.g., 300 ft./min. for a ⅛ inch wide contact area).

Various decorative visual effects can be achieved by the embossing. If the diffraction pattern is not to be continuous, a matte background can be provided by suitable modification of the embossing roller. Alternatively, the embossing pattern can, in parts, be filled in with coating material, such as ink or clear lacquer, in those areas where no embossed decoration is desired.

Figure 5:
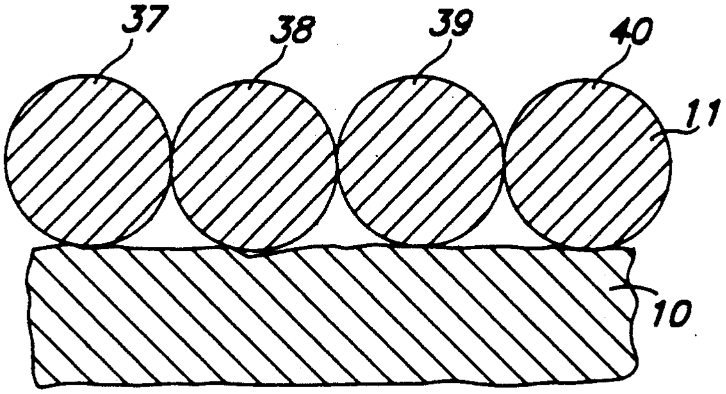
FIG. 5 is a cross-section of a laminate showing the substrate and the pre-membrane layer.

Turning now to a more microscopic view of the process and product of the present invention, FIG. 5 shows an enlarged cross-sectional view of the substrate 10 which is a paper sheet with a coating 11 of pre-membrane mixture, prior to the fusing of the pre-membrane mixture 11. FIG. 5 shows the thermoplastic spheroids 37, 38, 39, and 40 which make up the primary component of the pre-membrane mixture 11. The spheroids form the coating 11 on the substrate 10 prior to fusing of the coating.

It should be understood that FIG. 5 is figurative in that it shows the interface between the upper surface 13 of the substrate 10 and the lower layer of the uncured coating 11. Typically, the spheres would be piled up more than forty spheres deep on the substrate so that the coating is about 20 microns thick.

Figure 6:
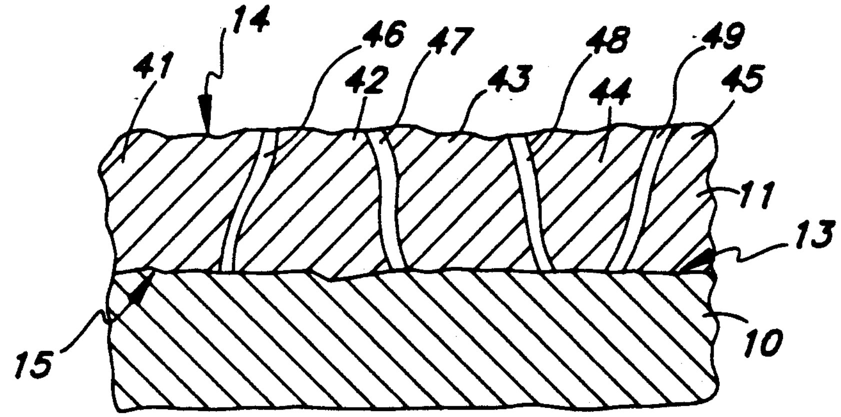
FIG. 6 is a cross-section of the laminate after the pre-membrane coating has been fused to form a porous membrane.

FIG. 6 shows a cross-sectional view of the laminate after the coating 11 has been fused to form a porous membrane. The spheroids present in FIG. 5 are fused together in such a way that pores 46, 47, 48 and 49 are formed between the spheroids which pores pass from the upper surface 14 of the coating 11 to the lower surface 15 of the coating 11. The lower surface of the coating 11 is, of course, in contact with the upper surface 13 of the substrate 10.

In the preferred embodiment, after fusing, the microporous membrane coating would be about 20 microns thick (top to bottom) and about 100 microns between pores. The pores are about five microns wide and form a mud-crack-like interconnected three-dimensional network which connects the coating surface to the substrate. For the sake of simplicity, the pores are shown as capillaries which run from the top to the bottom of the coating, but it should be understood that the pore structure may be more complicated, e.g., a series of interconnecting cracks. Applicant has observed that the final surface texture depends upon the choice of polymer particle dispersion (see Example 1, below) as well as the drying and embossing conditions. Longer drying times, and higher embossing temperatures, both tend to increase the time required for wicking oil. In general, a cracked or crazed surface provides superior oil wicking properties.

Figure 7:
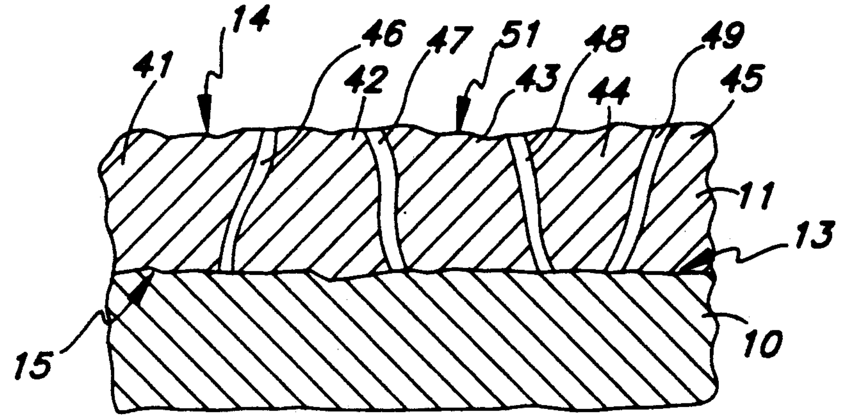
FIG. 7 is a cross-sectional view of the laminate after embossing.

FIG. 7 shows an enlarged cross-sectional view of the laminate of the present invention after the embossing of the upper or decorative surface of the coating 11 has been accomplished. The embossing is shown as grooves 51. Typically, the grooves are one micron peak-to-peak and one-half micron deep.

Figure 8:
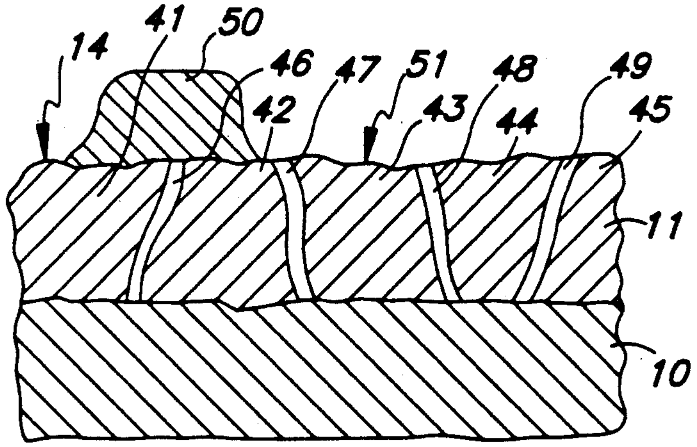
FIG. 8 is a cross-sectional view of the laminate after embossing and after a drop of human skin oil has been deposited on the embossed surface.

FIG. 8 shows an enlarged cross-sectional view of the laminate of the present invention with a drop of human skin oil 50 deposited on the upper surface 14 of the coating 11. The oil has penetrated the grooves 51 in the embossed surface and, because the index of refraction of the oil and of the thermoplastic from which the coating 11 is formed are not vastly different, the visual effect of the grooves beneath the oil is effectively extinguished.

Figure 9:
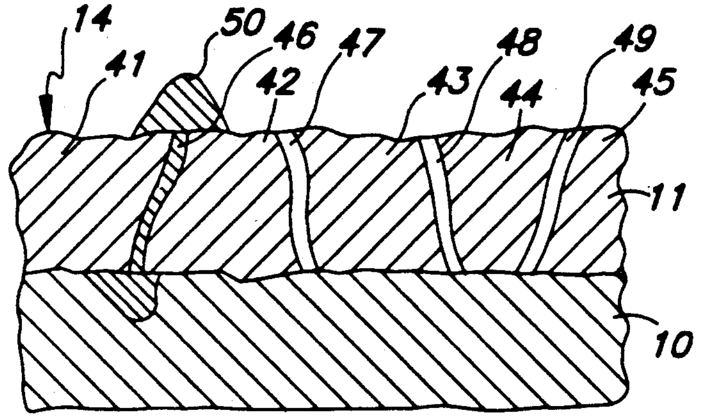
FIG. 9 is a cross-sectional view of the laminate showing the oil being wicked away from the embossed surface.

FIG. 9 shows an enlarged cross-sectional view of the laminate of the present invention in which the oil has wetted and been attracted to the internal surface of the pore 46 so that the oil is drawn down into the pore and toward the substrate 10.

Figure 10:
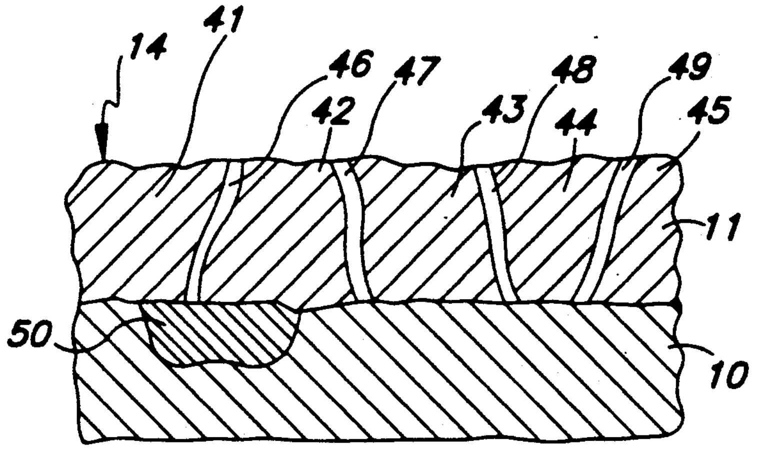
FIG. 10 is a cross-sectional view of the laminate showing the oil having been wicked to and absorbed by the substrate.

FIG. 10 shows an enlarged cross-sectional view of the laminate of the present invention in which the oil 50 has been effectively wicked away from the upper surface of the coating 11, along the pore 46 and completely absorbed by the substrate 10. The result is that the oil which previously disturbed the visual effect on the upper surface of the coating has been completely eliminated from the upper surface of the coating. Applicant has observed a typical transmission rate of between about one half minute and three minutes for finger oil to pass from the surface to the oil absorbing substrate.

The key element of the present invention is the microporous coating which is adapted to absorb, into its pores, any oil which is deposited on its decorative or embossed surface. The polymer from which the membrane is formed must form pores which have pore surfaces which are oleophilic, that is, they must attract or be wetted by human skin oil. In the preferred embodiment, the membrane would be formed by the fusion of thermoplastic polymeric particles of uniform size into the membrane skin populated with pores or microcracks capable of absorbing oil. As seen in Example 1, below, a particle diameter of about 0.5 microns is preferred. Applicant has also noted that the microporous coating has the ability to also transmit gasses, but repel water (hydrophobic). This might also have utility (with or without surface embossing) as a selective membrane in packaging produce by allowing respiration while preventing dehydration.

In the preferred embodiment, the pre-membrane mixture consists of uniform 0.5 micron diameter polystyrene spheroids dispersed in water with a plasticizer, colored pigment dispersions (if desired for appearance) and certain other processing aids. When this coating is applied to the paper substrate and dried at 130° C. (266° F.), the polystyrene particles fuse together, leaving a clear film containing interconnecting microcracks. These cracks are capable of wicking away any surface oils into the membrane and thereafter into the paper substrate below. The coating can be stored after fusing or thermally embossed immediately after fusing.

The pre-membrane mixture of the present invention would typically involve the following ingredients.

1. The binder, an aqueous dispersion of uniform polystyrene particles (Lytron 2502 from Morton International), is 48% solids in the aqueous carrier. The Lytron alone has good oil absorption and dries to a clear membrane. However, it exhibits curl when applied to the paper. Greater cohesive and adhesive strengths are also preferred. The binder (and its aqueous carrier) are approximately 80% by weight of the total dry coating weight. Within the Lytron series, applicants have observed that particles should preferably be at least 0.1 micron in diameter, with 0.5 micron diameter most preferred.

2. A plasticizer, e.g. butyl benzyl phthalate is needed to soften the coating. This reduces curl, reduces the glass transition temperature, (which also lowers the embossing temperature) and adds gloss to the coating. The plasticizer is less than 5% by weight of the dried coating and is kept to a minimum to allow the coating to adhere to the paper without causing blocking in the finished product.

3. An emulsifying agent, e.g., nonionic alkylphenyl polyether alcohol (Triton X-100 from Rohm and Haas), is needed to compatibilize the plasticizer with the polystyrene dispersion. The emulsifying agent can be 5% of the plasticizer weight or 0.2% of the total mix.

4. Pigment dispersions, (e.g., toluidene red (AIT 222 Day Glo Color Conp.)), can be added directly to the polystyrene/plasticizer mix.

5. A dispersing agent, (e.g., DISPERSE AYD W-28 from Daniel Products) should be added to the plasticizer/polystyrene mix to compatibilize the pigment dispersion with the polystyrene mix.

6. A Defoamer, (e.g., Bubble Breaker 748 from Witco Corp.) is incorporated into the mix after the plasticizer addition.

Formulation Data:

The plasticizer should be charged with the emulsifying agent. The binder is then added to the plasticizer under gentle agitation. The pigment dispersion can be slowly added to the mix, followed by the balance of the defoamer.

Misc. Data:

Two other latices were found to have oil-absorbing properties:

1. An aqueous dispersion of polyvinyl butyral (Butvar BR from Monsanto). This coating formed a very tacky film.

2. A carboxylated acrylic copolymer latex, (Hycar 26315 from B. F. Goodrich had slower oil absorption than Lytron.

The primer addition in formulation D adds adhesive strength to the coating. Paper bonds are enhanced if dried at a low temperature (110° C. as opposed to 130° C.). Reduced gloss and embossed definition result, however.

Formulation A Oil Absorbing Embossable Coating

| (Clear) | % by weight |
|---|---|
| Binder<br>Polystyrene pigment dispersion<br>Lytron 2502 from Monsanto | 95.00 |
| Plasticizer<br>Butyl Benzyl Phthalate | 4.75 |
| Emulsifier<br>nonionic Alkyl Phenyl Polyether<br>Alcohol Triton X-100 from Rohm & Haas | .25 |
| | 100.00 |

Formulation B Oil Absorbing Embossable Coating

| (Red transparent) | % by weight |
|---|---|
| Binder<br>Lytron 2502 | 79.00 |
| Plasticizer<br>Butyl Benzyl Phthalate | 3.9 |
| Emulsifying agent<br>Triton X-100 | 0.2 |
| Pigment Dispersion<br>Toluidine Red<br>AIT 222 Day Glo Color Corp. | 15.8 |
| Dispersing agent<br>Disperse AYD W-28 from Daniel Products | 0.3 |
| Defoamer<br>Bubble Breaker 748 from Witco Corp. | 0.8 |
| | 100.00 |

Formulation C Oil Absorbing Embossable Coating

| (White translucent) | % by weight |
|---|---|
| Binder<br>Lytron 2502 | 85.0 |
| Pigment Dispersion<br>Titanium Dioxide<br>WFD - 6102 From Sun Chemical Co. | 14.5 |
| Dispersant<br>Disperse Ayd W-28/Daniel Products | .25 |
| Defoamer<br>Bubble Breaker 748/Witco Corp. | .25 |
| | 100.00 |

Formulation D Oil absorbing Embossable Coating

| (Green transparent) | % by weight |
|---|---|
| Binder<br>Lytron 2502 | 80.7 |
| Primer<br>Styrene/acrylic dispersion<br>in water 49 T 70 from Morton | 2.0 |
| Pigment dispersion<br>(Phthalo Green) | 16.2 |

-continued

| | |
|---|---|
| AIT 544 from Day Glo Color Corp. | |
| Dispersant | 0.3 |
| Disperse AYD W-28/Daniel Products | |
| Defoamer | 0.8 |
| Bubble Breaker 748/Witco Corp. | |
| | 100.00 |

Formulation E Oil Absorbing Embossable Coating

| (Yellow transparent) | % by weight |
|---|---|
| Binder | 79.5 |
| Lytron 2502 | |
| Primer | 2.0 |
| Styrene/acrylic dispersion in water 49 T 70 from Morton | |
| Pigment dispersion | 15.5 |
| (Yellow) | |
| AIT 385 from Day Glo Color Corp. | |
| Dispersant | 0.2 |
| Disperse AYD W-28/Daniel Products | |
| Defoamer | 0.6 |
| Bubble Breaker 748/Witco Corp. | |
| Plasticizer | 2.0 |
| Butyl Benzyl Phthalate | |
| Emulsifier | 0.2 |
| Triton X-100 | |
| | 100.00 |

All of the above formulations are fully functional. Formulation E, with appropriate choice of color pigment, provides the best combination of properties. It can be fused by heating to 110° C. (230° F.) to form a very effective membrane. The preferred paper is high-wet-strength, clay-coated paper.

The invention will be further understood with reference to the following comparative examples.

EXAMPLE 1

The dispersions and latices of Table 1 were used without additives or modifiers to evaluate the properties of the polymers themselves in producing microembossed coated paper. The dispersions were coated on 35 grams per sq. meter Sibille Stenay clay-coated stock (One Newbury St., Peabody, Mass. 01960), using a #12 wire-wound rod. The samples were dried in a 130° C. oven for twenty seconds, then embossed at 120° C. using a diffraction embossed metallized mylar master. The quality of embossing was evaluated in terms of release of the master from the embossed coating.

The embossed coated papers were tested for oil wicking by smearing skin oil across the surface and measuring the time for the diffraction pattern to reappear. Adhesion of the coating to the paper was determined using 3M MAGIC tape (Minnesota Mining & Mfg. Co.) applied with finger pressure and pulled up quickly. The embossed surfaces were photographed at X200 magnification to show their void structure.

Both the LYTRON and the ROPAQUE styrene/acrylic copolymer dispersions showed wicking ability. Among the LYTRON dispersions, oil wicking efficiency generally increased as particle size increased.

The LYTRON and ROPAQUE samples evidenced cracking. In contrast, the BUTVAR BR, which showed no cracking, provided very slow wicking. Best results were obtained with the LYTRON 2502 dispersion, which provided excellent oil wicking, low blocking without metal transfer, and good adhesion.

In the Embossing and Adhesion columns of Table 1, "G" indicates "good", "F" indicates "fair", and "P" indicates "poor"; "MT" indicates transfer of metal from the metallized embossing master, a sign of poor release of the coating from the embossing master.

ADCOTE61JH61A is a styrene/acrylic copolymer dispersion of Morton Chemical Co., Chicago, Ill. 37R345 is a high molecular weight ethylene interpolymer dispersion from Morton Chemical Co. UNOCAL 3512 is an acrylic polymer dispersion from B. F. Goodrich Chemical Co., Cleveland, Ohio.

TABLE 1

| Dispersion | Particle Size (micron) | Oil Wicking (sec) | Embossing | Adhesion |
|---|---|---|---|---|
| Lytron 2101 | .10 | 240 | G/MT | G |
| Lytron 2203 | .20 | 90 | G/MT | G |
| Lytron 300 | .30 | 105 | G | G |
| Lytron 308 | .30 | 95 | F/MT | G |
| Lytron 604 | .30 | 122 | F/MT | P |
| Lytron 2502 | .50 | 30 | G | G |
| Lytron 2705 | .70 | 24 | G/MT | G |
| Butvar BR | .25-1.5 | +300 | G | P |
| Adcote | | | | |
| 61JH61A | — | none | G | G |
| 37R345 | — | none | Blocked | G |
| Hycar 26315 | — | 120 | Blocked | P |
| Unocal 3512 | — | — | Blocked | P |
| Ropaque | | | | |
| OP-84 | .55 | 60 | F/MT | P |
| OP-91 | 1.0 | 67 | G | P |

EXAMPLE 2

The binders of Table 2, below, were coated onto paper, dried, and embossed as in Example 1. All of the resulting embossed media were observed to lack oil absorbancy.

TABLE 2

Polymeric Coatings With Poor Oil Wicking Characteristics

1. Polyvinyl butyrate (PVB solution B-72/Monsanto)
2. Nitrocellulose ink with Sulfonamide Plasticizer (Santicizer MHP)
3. PVB with Isodecyl diPhenyl Phosphate (Santicizer 148)
4. PVB with Di-n hexyl Adipate (Santicizer 367/Monsanto)
5. Vinyl Chloride/Vinyl Acetate TerPolymer solution (VAGH/Union Carbide)
6. Ethylene Vinyl Acetate CoPolymer emulsion (Polybond X34-21/Morton)
7. Acrylic ester CoPolymer emulsion (Hycar 26315/Goodrich)
8. Acrylic emulsion (Rhoplex LC-40/Rohm & Haas)
9. Polyurethane acqueous dispersion (Neores R-960/ici)
10. Ethylene Vinyl Chloride Latex (Airflex 4514/Air Products)
11. Styrene acrylic CoPolymer emulsion (Nacrylic 78-6334/National)
12. Acrylic ester CoPolymer emulsion (Hycar 26084/Goodrich)
13. Blends of Styrene acrylic CoPolymer emulsion and Poly Styrene dispersion (Nat-78 National/Lytron 2502 Morton)
14. Acrylic CoPolymer emulsion (Neocryl Bt-24/ici)
15. Poly Styrene Solution (18-210/Amoco)

Other aspects of the invention will be apparent to those of ordinary skill in the art. In addition to its manifold decorative applications, the oil absorbing coated sheets of the invention may be employed in applications (e.g., commercial paper) in which security against counterfeiting is desired. This technique may also be used to produce tamper evident packaging, by using a fragile substrate which would indicate tampering.

The invention, therefore, is not intended to be limited to the preferred embodiments described herein, but rather is defined by the claims and equivalents thereof.

The invention has been thus described, what is claimed as new and desired to secure by Letters Patent is:

1. A coated sheet for decorative or informational applications, comprised of:

A. a substrate

B. an oil absorbing layer associated with the substrate having an oilabsorbing surface, C. a decorative layer having a first side and a second side, the second side being attached to the substrate, the decorative layer being formed of a porous membrane having pores which pass through the decorative layer from the first side to the second side, each pore having a surface adapted to attract oil from the first side of the decorative layer and convey the oil to the oilabsorbing layer.

2. A coated sheet as recited in claim 1, wherein the substrate and oilabsorbing layer are a single sheet.

3. A coated sheet as recited in claim 1, wherein the first side of the decorative layer is embossed to form a diffraction grating or hologram.

4. A coated sheet as recited in claim 1, wherein the porous membrane is formed of polymer particles partially fused together to form the pores.

5. A coated sheet as recited in claim 4, wherein the pores have oleophilic surfaces.

6. A coated sheet as recited in claim 4, wherein the particles include a styrene polymer.

* * * * *

UNITED STATES PATENT AND TRADEMARK OFFICE

CERTIFICATE OF CORRECTION

PATENT NO. : 5,182,157

DATED : January 26, 1993

INVENTOR(S) : John J. Fitch

It is certified that error appears in the above-indentified patent and that said Letters Patent is hereby corrected as shown below:

On the Title page, item [54] and col. 1, line 1 , change the title to --COATED SHEET FOR DECORATIVE OR INFORMATIONAL APPLICATIONS--.

Signed and Sealed this

Twenty-second Day of February, 1994

Attest:

Bruce Lehman

BRUCE LEHMAN

*Attesting Officer*

*Commissioner of Patents and Trademarks*